United States Patent
Usman

(10) Patent No.: US 11,433,728 B2
(45) Date of Patent: Sep. 6, 2022

(54) ACTIVE CONTROL SYSTEM

(71) Applicant: Hyperloop Technologies, Inc., Los Angeles, CA (US)

(72) Inventor: Irfan-ur-rab Usman, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 65 days.

(21) Appl. No.: 16/023,899

(22) Filed: Jun. 29, 2018

(65) Prior Publication Data

US 2019/0001780 A1    Jan. 3, 2019

Related U.S. Application Data

(60) Provisional application No. 62/527,567, filed on Jun. 30, 2017.

(51) Int. Cl.

| | |
|---|---|
| *B60G 17/016* | (2006.01) |
| *B60G 17/018* | (2006.01) |
| *B60G 17/019* | (2006.01) |
| *B60G 21/08* | (2006.01) |
| *B60L 13/06* | (2006.01) |
| *B60L 15/00* | (2006.01) |

(52) U.S. Cl.
CPC ....... *B60G 17/0164* (2013.01); *B60G 17/018* (2013.01); *B60G 17/01908* (2013.01); *B60G 17/01933* (2013.01); *B60G 21/08* (2013.01); *B60G 2600/602* (2013.01); *B60G 2600/604* (2013.01)

(58) Field of Classification Search
CPC .............. B60G 21/08; B60G 2600/602; B60G 2600/604; B60G 17/0164; B60G 17/01933; B60G 17/01908; B60G 17/018

USPC .......................................................... 701/38
See application file for complete search history.

(56) References Cited

U.S. PATENT DOCUMENTS

| | | |
|---|---|---|
| 3,847,086 A | 11/1974 | Steenbeck |
| 3,931,767 A | 1/1976 | Karch |
| 3,939,776 A | 2/1976 | Ross et al. |

(Continued)

FOREIGN PATENT DOCUMENTS

| | | |
|---|---|---|
| DE | 19923161 | 12/1999 |
| WO | 2016/040374 | 3/2016 |

(Continued)

OTHER PUBLICATIONS

Int'l Search Report (Forms PCT/ISA/220 & 210) conducted in counterpart Int'l Appln. No. PCT/US2018/040388 (dated Sep. 20, 2018).

(Continued)

*Primary Examiner* — Abby Y Lin
*Assistant Examiner* — Hossam M Abd El Latif
(74) *Attorney, Agent, or Firm* — Greenblum & Bernstein, P.L.C.

(57) ABSTRACT

An active control system for a mass traveling along a guideway and method for active control of a mass traveling along a guideway. The active control system includes at least one displacement sensor and at least one motion sensor. Signals from the at least one displacement sensor and the least one motion sensor are processed to adjust a displacement of a reference location on the mass from a fixed reference.

20 Claims, 5 Drawing Sheets

(56) References Cited

U.S. PATENT DOCUMENTS

| | | |
|---|---|---|
| 4,603,640 A | 8/1986 | Miller et al. |
| 4,866,380 A | 9/1989 | Meins et al. |
| 5,097,419 A | 3/1992 | Lizell |
| 5,732,636 A | 3/1998 | Wang |
| 7,637,214 B2 | 12/2009 | Beck et al. |
| 7,835,830 B2 | 11/2010 | Ellmann et al. |
| 7,841,564 B2 | 11/2010 | Ellmann et al. |
| 8,118,266 B2 | 2/2012 | Zheng et al. |
| 8,193,886 B2 | 6/2012 | Loser et al. |
| 8,359,981 B2 | 1/2013 | Hahn et al. |
| 9,221,481 B2 | 12/2015 | Desbordes et al. |
| 9,254,759 B1 | 2/2016 | Henderson et al. |
| 9,554,285 B2 | 1/2017 | Zasowski |
| 9,718,630 B2 | 8/2017 | Bambrogan et al. |
| 10,056,816 B2 | 8/2018 | Lu |
| 10,974,909 B2 | 4/2021 | Davidson et al. |
| 2008/0083346 A1 | 4/2008 | Fiske et al. |
| 2009/0024277 A1 | 1/2009 | Poilbout |
| 2009/0224502 A1 | 9/2009 | Yamawaki et al. |
| 2011/0271867 A1 | 11/2011 | Liu |
| 2012/0035808 A1 | 2/2012 | Jolly et al. |
| 2014/0297117 A1* | 10/2014 | Near ............ B60G 11/265 701/37 |
| 2015/0021866 A1* | 1/2015 | Solbrack ........ B60G 17/0165 280/6.155 |
| 2015/0105979 A1 | 4/2015 | Hilderband et al. |
| 2016/0229418 A1 | 8/2016 | Bambrogan et al. |
| 2017/0067941 A1* | 3/2017 | Hegedus ............ G01R 15/202 |
| 2017/0182859 A1* | 6/2017 | Anderson .......... B60G 17/019 |
| 2017/0291503 A1 | 10/2017 | Wamble, III et al. |
| 2020/0164750 A1 | 5/2020 | Kooger et al. |
| 2020/0376965 A1 | 12/2020 | Wamble, III et al. |
| 2021/0016814 A1 | 1/2021 | Geuze et al. |

FOREIGN PATENT DOCUMENTS

| | | |
|---|---|---|
| WO | WO2020/060410 | 3/2020 |
| WO | WO2020/122718 | 6/2020 |

OTHER PUBLICATIONS

Int'l Written Opinion (Form PCT/ISA/237) conducted in counterpart Int'l Appln. No. PCT/US2018/040388 (dated Sep. 20, 2018).

Europe Office Action conducted in counterpart Europe Appln. No. 18823622.8 (dated Feb. 5, 2021).

Ho, "Is this Chinese protype the shape of maglev train tech to come?" South China Morning Post.

Cassat et al., "Maglev projects technology aspect and choices," IEEE Transactions on Applied Superconductivity (Apr. 2002); https://www.researchgate.net/publication/224055510.

Cassat et al., "Maglev—Worldwide Status and Technical Review," Electrotechnique du Futur (Dec. 14&15, 2011); https://www.researchgate.net/publication/236993225.

Jian, "'Floating' in the struggle—the youth power of China's independent maglev train," Xinhua News Agency (May 3, 2020); www.xinhuanet.com/politics/2020-05/03/c_1125939110.htm.

India Office Action conducted in counterpart India Appln. No. 202047003872 (dated Mar. 2, 2022).

Saudi Arabia 1$^{st}$ Substantive Examination Report conducted in counterpart Saudi Arabia Appln. No. 520410966 (Apr. 11, 2022) (w/ English translation).

* cited by examiner

ACTIVE CONTROL SYSTEM

CROSS-REFERENCE TO RELATED APPLICATION

This application claims the benefit of U.S. Provisional Application No. 62/527,567 filed Jun. 30, 2017, the disclosure of which is expressly incorporated by reference herein in its entirety.

BACKGROUND OF THE DISCLOSURE

1. Field of the Disclosure

The present disclosure relates to a control system, namely a control system that minimizes vibration and power consumption.

2. Background of the Disclosure

An active suspension is a type of vehicle suspension that controls the vertical movement of the bearings relative to the chassis with an onboard system. Generally, these systems have at least one of two constraints: (1) the bearings are used both for propulsion and support; and/or (2) the bearings are not operating in a system that stays in regulation, e.g., maintains some constant reference relative to a global system. Thus, there is a need for an improved active control system for a vehicle suspension.

BRIEF SUMMARY OF EMBODIMENTS OF THE DISCLOSURE

The novel features which are characteristic of the disclosure, both as to structure and method of operation thereof, together with further aims and advantages thereof, will be understood from the following description, considered in connection with the accompanying drawings, in which the embodiment of the disclosure are illustrated by way of example. It is to be expressly understood, however, that the drawings are for the purpose of illustration and description only, and they are not intended as a definition of the limits of the disclosure.

By implementing aspects of the disclosure, and considering the removal of the constraints of (1) the bearings being used both for propulsion and support; and/or (2) the bearings not operating in a system that stays in regulation, new and universally applicable control systems can be created.

Embodiments of the present disclosure consider a novel system for providing an active control system for a moving body. The active control system includes at least one displacement sensor with a low-pass filter and at least one motion sensor, e.g., an accelerometer, gyroscope, rate sensor, etc., with a high-pass filter. A controller uses an actuator to maintain the position of the system in relation to a global spline while also driving the acceleration component to zero. Thus, power dissipation is reduced to the static dissipation and the remnants of the low-frequency components of the displacement sensor that are below the threshold of the high-pass filter. Thus, in accordance with aspects of the disclosure, the active control system robustly rejects force disturbances and does not track local track deviations. Thereby, power requirements are minimized without compromising on force disturbance rejection requirements.

Embodiments of the invention are directed to an active control system and method of motion control for a track-based maglev. These embodiments are advantages in that they provide an ability to minimize accelerations felt by the passenger while simultaneously allowing very loose/rough track tolerances. It does this by implementing a type of sensor fusion technique with multiple sensors and particular filter types.

BRIEF DESCRIPTION OF THE DRAWINGS

These and other features of this disclosure will be best understood by reference to the following detailed description of a preferred embodiment of the disclosure, taken in conjunction with the accompanying drawings, in which.

DETAILED DESCRIPTION OF THE EMBODIMENTS OF THE DISCLOSURE

Figure 1:
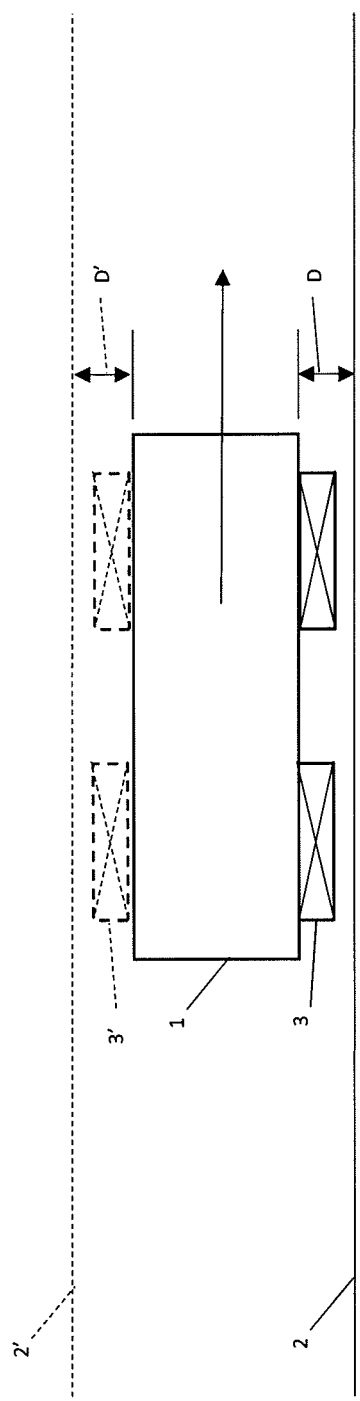
FIG. 1 depicts an exemplary environment in which embodiments of the present invention are practiced

Embodiments of the present disclosure may be used in a transportation system, for example, as described in commonly-assigned application Ser. No. 15/007,783, titled "Transportation System," the contents of which are hereby expressly incorporated by reference herein in their entirety.

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded. As used herein, the indefinite article "a" indicates one as well as more than one and does not necessarily limit its referent noun to the singular.

Except where otherwise indicated, all numbers expressing quantities used in the specification and claims are to be understood as being modified in all examples by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100 ±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for example a composition comprising a compound A may include other compounds besides A. However, the term "comprising" also covers the more restrictive meanings of "consisting essentially of" and "consisting of", so that for example "a composition comprising a compound A" may also (essentially) consist of the compound A.

The various embodiments disclosed herein can be used separately and in various combinations unless specifically stated to the contrary.

In an exemplary embodiment, an active control system includes a controller that is operable to sense a mass, which can be a sprung or an unsprung mass, and drive its high-frequency acceleration components to zero while following low-frequency local displacement or gap conditions. The mass can be suspended from an overhead guideway or supported on a ground based guideway. In embodiments, the active control system includes at least one displacement sensor, at least one motion sensor, at least one high-pass filter, at least one low-pass filter, at least one controller, and at least one actuator. The motion sensor may use a plurality of sensors, such as an accelerometer and a gyroscope, for example, to detect any number of inertial measurement units, such as body accelerations and/or velocities, for example, in both translation and rotation axes. The motion sensor may detect changes in the vertical and/or lateral speed of motion of the active control system, e.g., when the control system accelerates and decelerates in the plane that is substantially orthogonal to the plane created by the ground.

In embodiments, the displacement sensor can include any displacement sensors known to a person of skill in the art. The displacement sensor may be configured to measure a displacement between a reference surface on a moving body and a reference surface on a guideway side. The output from the motion sensor is processed through a high-pass filter to remove gravitational components of any acceleration signals and any DC offsets. Thus, in accordance with aspects of the disclosure, the filtered output can be integrated, at least once, and is without drift due to numerical/integration effects. The output from the displacement sensor is processed through a low-pass filter, which decreases or attenuates effects of high spatial frequency guideway components while retaining the average displacement, or long spatial frequency components. The filtered signal from the motion sensor, which is integrated, at least once, to recover a signal with units of displacement and the filtered signal from the displacement sensor are superimposed to create a synthesized pseudo-displacement signal. The pseudo-displacement signal can be subtracted from a reference displacement signal to produce a pseudo-error signal which can be fed to a controller. The output of the controller can then be fed to an actuator to compensate the pseudo-error, such as by the controller then instructing the actuator to move the reference surface on the moving body to maintain a desired displacement from the reference surface on the guideway side.

In embodiments, a gap sensor may used in place of a displacement sensor. The gap sensor can include any gap sensors known to a person of skill in the art. The gap sensor may be configured to measure a gap distance between a reference surface on the moving body and a reference surface on the guideway side. The output from the motion sensor is processed through a high-pass filter to remove the gravitational components of any acceleration signals and any DC offsets. In accordance with aspects of the disclosure, the filtered output can be integrated, at least once, and without displacement due to drift on the output signal. The output from the gap sensor is processed through a low-pass filter, which decreases or attenuates effects of high spatial frequency guideway components while retaining the average displacement, or long spatial frequency components. The filtered signal from the motion sensor, which is integrated, at least once, to recover a signal with units of gap distance and the filtered signal from the displacement sensor are superimposed to create a synthesized pseudo-displacement signal. The pseudo-displacement signal can be subtracted from a reference displacement signal to produce a pseudo-error signal which can be fed to a controller. The output of the controller can then be fed to an actuator to compensate the pseudo-error, such as by the controller then instructing the actuator to move the reference surface on the moving body to maintain a desired constant gap between the reference surface on the moving body and the reference surface on the guideway side.

An embodiment considers the active control system may be for a vehicle. The active control system may be substantially decoupled from the vehicle via a suspension. The suspension may be any of those known, such as springs, dampers, and/or electromagnetic suspension systems. The actuator may substantially connect the suspension to bearings.

In an embodiment, the bearings may include wheels. The controller may instruct an actuator to vary displacement between the wheel and the mass to reduce the pseudo-error, such as through varying the vertical distance between the suspension and the wheel and/or through varying the angle of the wheel's connection to the suspension.

Embodiments of the present disclosure combine the active control system with an electromagnetic suspension system may include an electromagnet that acts as the actuator. In some embodiments, the electromagnet may be balanced with the force of gravity on the vehicle. In an embodiment, the electromagnet is bidirectional and self-balancing. The vehicle may be suspended or levitate while it is in motion. If the active control system senses that the displacement or distance has increased past a preselected maximum displacement or distance tolerance, then the active control system may adjust the direction and strength of the current through the coil to increase the attractive force between the electromagnet and guideway, returning the vehicle to within the preselected displacement or distance tolerance. Likewise, if the active control system senses that the distance between the vehicle and the guideway has decreased past a preselected minimum displacement or distance tolerance, then the active control system may adjust the direction and strength of the current through the coil to decrease the attractive force (or create a force in the opposite direction) between the vehicle and guideway, returning the vehicle to within the preselected displacement or distance tolerance.

FIG. 1 shows an exemplary embodiment in which the active control system can be utilized. A moving body 1, e.g., a vehicle, pod, force generation engine, etc., can be arranged to travel over a guideway 2, e.g., a track, via bearings 3, wheels, electromagnets, etc. In an alternate embodiments, moving body 1 can be arranged to travel suspended from a guideway 2' via bearings 3'. Bearings 3, with respect to guideway 2, can be oriented vertically, horizontally or to any angle in between. As moving body 1 travels along guideway 2, 2', a displacement D, D' may occur between, e.g., a reference surface on moving body 1 and a reference surface on guideway 2, 2'. According to embodiments, the active control system can adjust a sensed displacement to a reference displacement, e.g., by adjusting a current direction and strength through a coil of the electromagnetic bearing.

Figure 2:
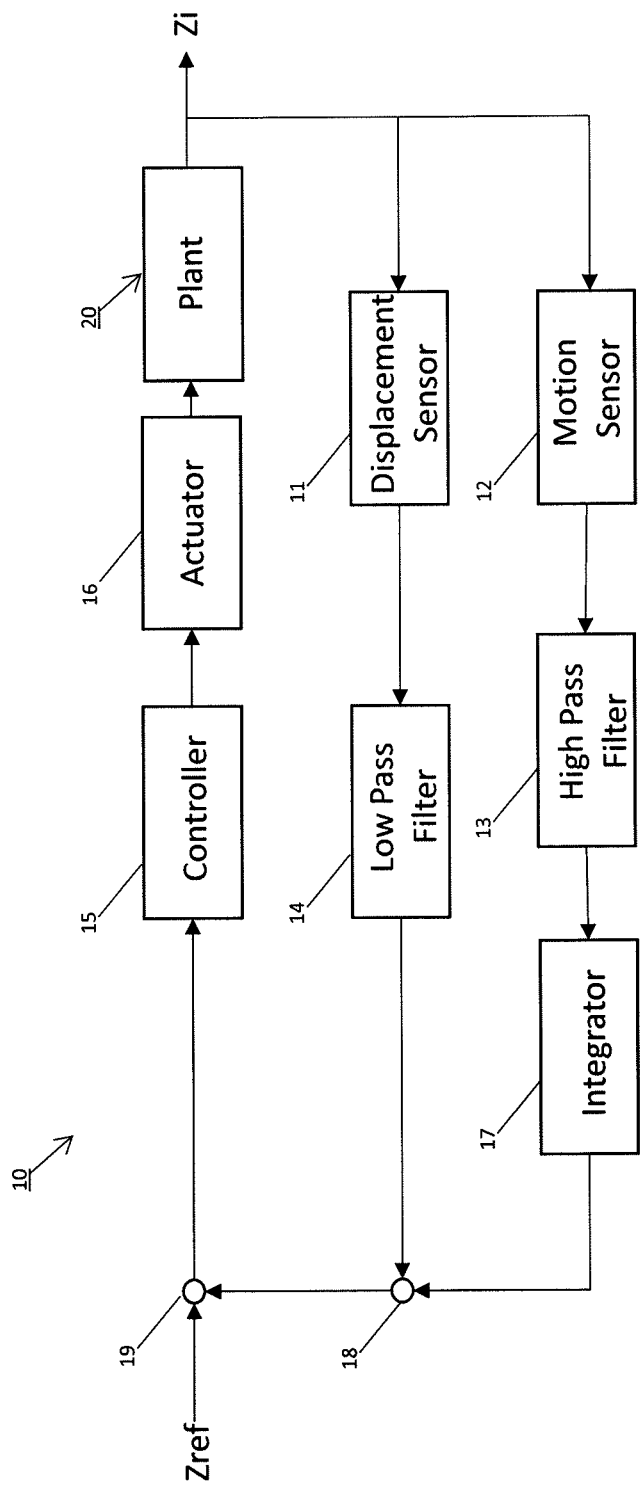
FIG. 2 shows an exemplary embodiment of a control system in accordance with aspects of the disclosure.

FIG. 2 depicts an exemplary embodiment of a control system 10 in accordance with aspects of the disclosure. As shown in FIG. 2, the control system 10 for an active electromagnetic suspension includes at least one displacement sensor 11, at least one motion sensor 12, at least one high-pass filter 13, and at least one low-pass filter 14. The control system 10 also includes at least one controller 15 and at least one actuator 16. The displacement sensor 11 may be configured to measure the displacement between the reference surface on a moving body, e.g., a force generation engine, and a reference surface on the guideway side. The output from the motion sensor 12 is processed through the at least one high-pass filter 13 to remove the gravitational components of any acceleration, velocity, rate signals and any DC offsets. According to aspects of the disclosure, the filtered output can be integrated at least once and is without displacement due to drift on the output signal. The output from the displacement sensor 11 is processed through a low-pass filter 14, which decreases attenuated effects of high spatial frequency guideway components while retaining the average displacement, or long spatial frequency components. The high pass filtered signal from the motion sensor 12 is integrated at least once in at least one integrator 17 to produce a signal with units of displacement and the low pass filtered signal from the displacement sensor 11 are superimposed in a mixer 18 to create a synthesized pseudo-displacement signal. In particular, when the motion sensor senses velocity, the signal is integrated once to produce a displacement signal, and when the motion sensor senses acceleration, the signal is integrated twice in order to produce a displacement signal. In embodiments, it is contemplated that the filtered signal can alternatively be supplied to a derivative operator instead of an integrator.

The pseudo-displacement signal can be subtracted from a reference displacement signal Zref in a subtraction unit 19 to produce a pseudo-error signal which can be fed to the controller 15. The output of the controller 15 can then be fed to the actuator 16 to compensate the pseudo-error by interacting with the plant 20 under control, such as by the controller 15 then instructing the actuator 16 to move or displace the mass in time so that the reference surface on the moving body relative to the reference surface on the guideway side to maintain a desired displacement distance or position. The input into plant 20 can be an electrical signal, such as a voltage or current, or a mechanical signal such as a force, a velocity, or a displacement.

The low-pass filter on displacement and high pass filter on acceleration is an example of shaping the frequency content of interest and reducing the signal, e.g. at least one operation of integrating or taking the derivative with respect to time or space, to identical units to use for superposition. The relevant frequency content of any signal can be further extracted using a multiplicity of filter types, including but not limited to band-pass, band-stop, notch, resonator, etc. In embodiments, it is preferable that there are no gaps in the frequency spectrum between the low end frequency of high pass filter 13 and the high end of low pass filter 14, e.g., low pass filter 14 is <1 Hz and high pass filter 13 is >1 Hz. Further, embodiments contemplate configuring low pass filter 14 as a band stop filter that comprises a low pass filter, a high pass filter and a notch filter. Further embodiments contemplate configuring high pass filter 13 as a band pass filter or a resonator. It is also understood that a second high pass filter can be arranged to filter the displacement signal output from the integrator.

Figure 3:
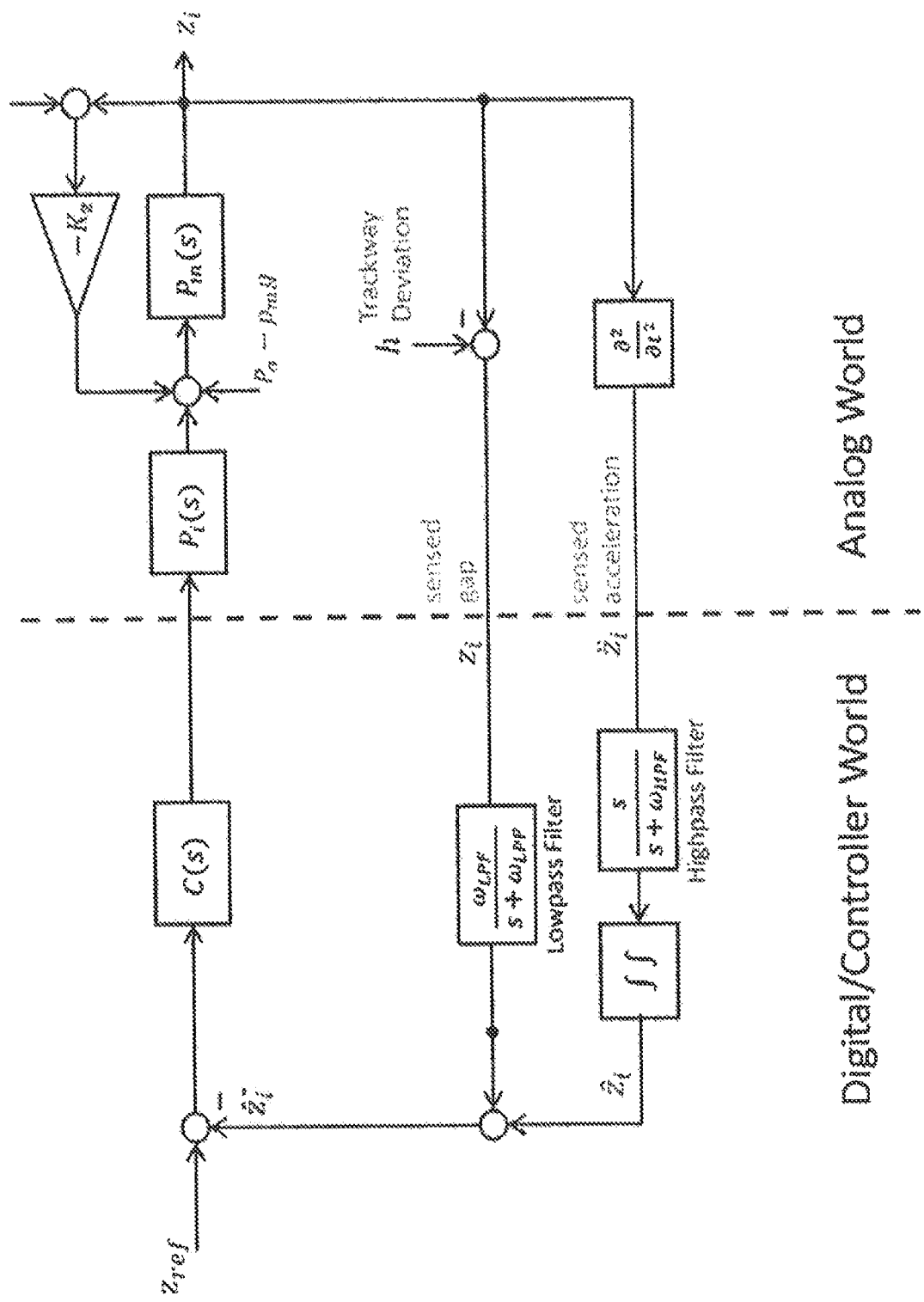
FIG. 3 shows another exemplary embodiment of a control system in accordance with aspects of the disclosure.

Another embodiment of the active control system is depicted in FIG. 3, where the actuator is more particularly shown.

Figure 4:
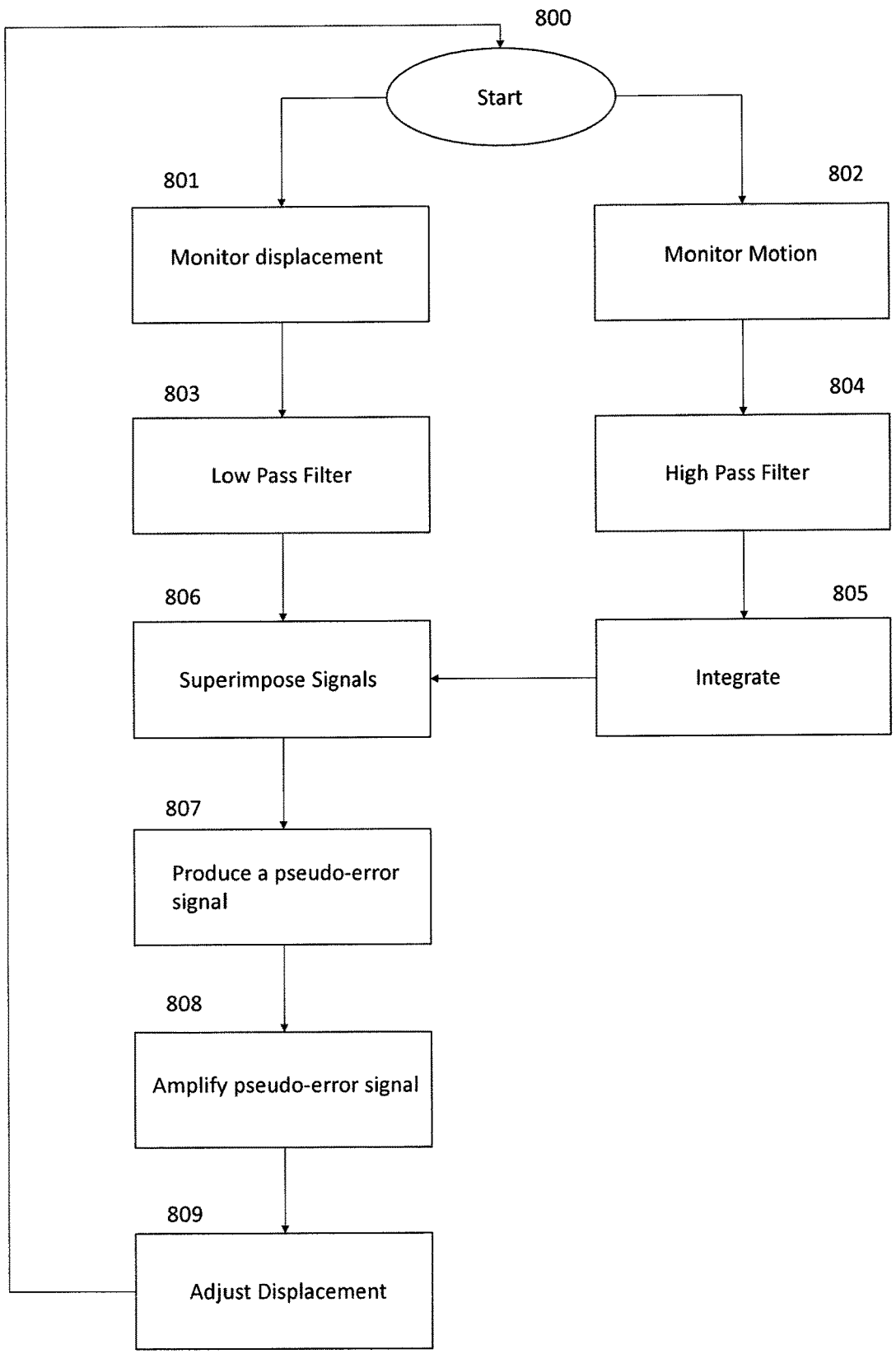
FIG. 4 shows a flow diagram of an exemplary process for active control.

FIG. 4 shows an exemplary flow diagram of a process for operating the active control system. The depicted flow diagram is merely illustrative and is not to be construed as limiting embodiments of the invention. The process begins at S300 and separately monitors the displacement of (or gap between) a reference surface of the moving body from a fixed reference, e.g., a reference surface of the guideway, at 301, and the motion of the moving body along the guideway, at 302. The sensed displacement is filtered in a low pass filter at 303 to produce a filtered displacement signal. The sensed motion is filtered in a high pass filter at 304 and then integrated at least once at 305 to produce a displacement signal from the motion. If the sensed motion is an acceleration, the signal is integrated twice at 305 and if the sensed motion is a velocity, the signal is integrated once at 305.

At 306, the filtered displacement signal and the displacement signal from the motion are superimposed on each other to produce the synthesized pseudo-displacement signal, and the superimposed signals are subtracted from a predetermined displacement reference to produce a pseudo-error signal at 307. The pseudo-error signal is amplified at 308 and fed to the actuator at 309 to move or displace the moving body in time so that the reference surface on the moving body relative to the reference surface on the guideway side to maintain the predetermined displacement distance or position.

System Environment

Aspects of embodiments of the present disclosure (e.g., control systems for the active electromagnetic suspension and methods for active control of such electromagnetic suspensions or of vehicles) can be implemented by such special purpose hardware-based systems that perform the specified functions or acts, or combinations of special purpose hardware and computer instructions and/or software, as described above. The method/control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a USB key, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Figure 5:
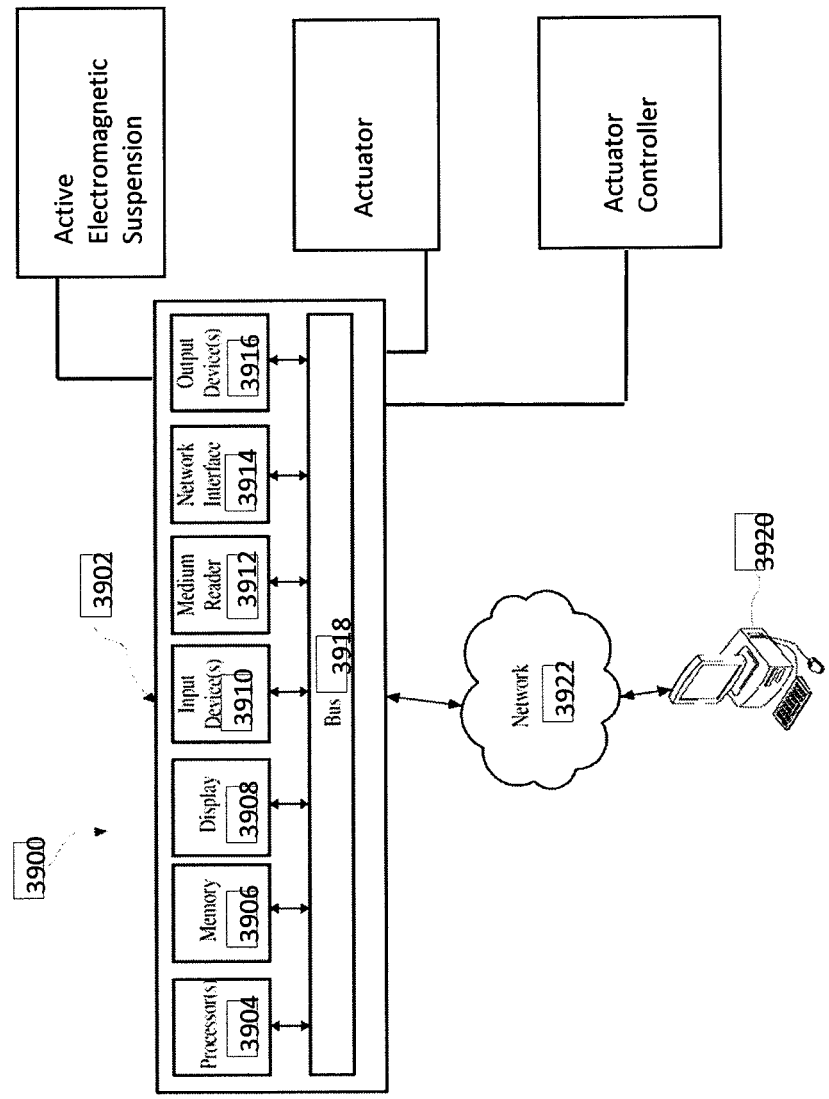
FIG. 5 depicts an exemplary environment for practicing aspects of the present disclosure.

FIG. 5 is an exemplary system for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks or cloud environment.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 5, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 5, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof. As shown in FIG. 5, the computer system 3902 may include communication and/or power connections to the active electromagnetic suspension, an actuator, and an actuator controller, in accordance with aspects of the disclosure.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 5. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the invention are not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

While the specification describes particular embodiments of the present disclosure, those of ordinary skill can devise variations of the present disclosure without departing from the inventive concept.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

While the specification describes particular embodiments of the present disclosure, those of ordinary skill can devise variations of the present disclosure without departing from the inventive concept.

Insofar as the description above and the accompanying drawing disclose any additional subject matter that is not within the scope of the claims below, the embodiments are not dedicated to the public and the right to file one or more applications to claim such additional embodiments is reserved.

What is claimed is:

1. An active control system for a mass traveling along a guideway, comprising:
    at least one displacement sensor measuring a displacement between a mass reference surface on the mass and a guideway reference surface on a guideway side;
    at least one motion sensor;
    at least one first filter comprising at least one of:
       a low pass filter,
       a notch filter, or
       a combination of a low and high pass filter;
    at least one second filter comprising at least one of:
       a high pass filter,
       a resonator or
       a bandpass filter; and
    a mixer,
    wherein the at least one first filter is coupled to the at least one displacement sensor in a first branch to process signals from the at least one displacement sensor, and the at least one second filter is coupled to the at least one motion sensor in a second branch, which is in parallel to the first branch, to process signals from the at least one motion sensor, and
    wherein signals from the first branch and signals from the second branch are processed and then mixed in the mixer to adjust a displacement of the mass reference surface from the guideway reference surface.

2. The active control system according to claim 1, wherein a combined frequency spectrum of the at least one low pass filter and the at least one high pass filter is continuous.

3. The active control system according to claim 1, wherein the first filter comprises a notch filter and the second filter comprises at least one bandpass filter.

4. The active control system according to claim 1, wherein the first filter comprises a high pass filter and a low pass filter.

5. The active control system according to claim 1, further comprising:
    at least one integrator or derivative operator coupled to receive the filtered signals from the at least one motion sensor.

6. An active control system for a mass traveling along a guideway, comprising:
    at least one displacement sensor measuring a displacement between a mass reference surface on the mass and a guideway reference surface on a guideway side;
    at least one motion sensor;
    at least one first filter; and
    at least one second filter,
    wherein the at least one displacement sensor is coupled to the at least one first filter and the at least one motion sensor is coupled to the at least one second filter,
    wherein signals from the at least one displacement sensor are processed in the at least one first filter to form first filtered displacement sensor signals and signals from the least one motion sensor are processed in the at least one second filter to form second filtered motion sensor signals;
    an integrator or a derivative operator is coupled to receive the second filtered motion sensor signals to produce integrated second filtered motion signals or derivative operated second filtered motion signals;
    a mixer to superimpose the first filtered displacement sensor signals with the integrated second filtered motion signals or with the derivative operated second filtered motion signals to produce a synthesized pseudo-displacement signal; and
    an actuator to adjust the displacement of the mass reference surface from the guideway reference surface based on the synthesized pseudo-displacement signal.

7. The active control system according to claim 6, further comprising:
    a comparator to determine a pseudo error signal, which is a difference between a predetermined reference displacement and the synthesized pseudo-displacement signal.

8. The active control system according to claim 7, further comprising:
    a controller coupled to receive the pseudo error signal and to control an actuator to adjust the displacement of the mass reference surface on the mass from the guideway reference surface.

9. The active control system according to claim 1, wherein the at least one displacement sensor comprises at least one of an accelerometer, a gyroscope or rate sensor.

10. The active control system according to claim 1, wherein the mass comprises a vehicle having bearings for moving along the guideway.

11. The active control system according to claim 10, wherein the vehicle comprises a pod, the guideway comprises a track, and wherein the pod is configured to be suspended from or travel over the track.

12. A method for active control of a mass traveling along a guideway, comprising:
    monitoring signals corresponding to a displacement of a mass reference surface on the mass with respect to a guideway reference surface on a guideway side;
    monitoring signals corresponding to motion of the mass along the guideway;
    processing the monitored displacement signals in at least one of a low pass filter, a notch filter or a combination of a low and high pass filter;

processing the monitored motion signals in at least one of a high pass filter, a resonator or a bandpass filter;

mixing the processed monitored displacement signals and the processed monitored motion signals in a mixer; and controlling an actuator to adjust the displacement of the mass reference surface from the guideway reference surface according to the processed monitored displacement signals and the processed monitored motion signals.

13. The method according to claim 12, wherein the processing comprises:

extracting relevant frequency content of the motion and displacement signals using filters comprising at least one of a band-pass, band-stop, notch, or resonator.

14. The method according to claim 12, wherein the processing further comprises:

integrating, at least one time, the filtered signals from the at least one motion sensor.

15. The method according to claim 14, wherein the processing further comprises:

superimposing the filtered displacement signals and the integrated filtered motion signals to produce a synthesized pseudo-displacement signal.

16. The method according to claim 15, wherein the processing further comprises:

determining a difference between a predetermined reference displacement and the synthesized pseudo-displacement signal as a pseudo error signal.

17. The method according to claim 16, wherein the controlling comprises:

controlling an actuator to adjust the displacement of the mass reference surface from the guideway reference surface based on the pseudo error signal.

18. The method according to claim 12, wherein the guideway comprises a track and the mass comprises a vehicle with bearings configured for the vehicle to move over the track or to be suspended from the track.

19. The active control system according to claim 1, further comprising an integrator or a derivative operator arranged in the second branch to process the second filtered motion sensor signals to produce integrated filtered motion signals or derivative operated motion signals in the second branch.

20. The active control system according to claim 19, wherein the mixer is arranged to process the signals from the first branch and signals from the second branch by superimposing signals output from the first branch with the signals output from the second branch.

* * * * *